(12) United States Patent
Beu et al.

(10) Patent No.: US 10,572,259 B2
(45) Date of Patent: Feb. 25, 2020

(54) HINTS IN A DATA PROCESSING APPARATUS

(71) Applicant: Arm Limited, Cambridge (GB)

(72) Inventors: Jesse Garrett Beu, Austin, TX (US); Alejandro Rico Carro, Austin, TX (US); Lee Evan Eisen, Round Rock, TX (US); Michael Filippo, Driftwood, TX (US)

(73) Assignee: ARM LIMITED, Cambridge (GB)

( * ) Notice: Subject to any disclaimer, the term of this patent is extended or adjusted under 35 U.S.C. 154(b) by 83 days.

(21) Appl. No.: 15/876,430

(22) Filed: Jan. 22, 2018

(65) Prior Publication Data

US 2019/0227796 A1 Jul. 25, 2019

(51) Int. Cl.
*G06F 9/30* (2018.01)
*G06F 12/0875* (2016.01)

(52) U.S. Cl.
CPC ........ *G06F 9/3016* (2013.01); *G06F 9/30036* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 5,303,358 A | * | 4/1994 | Baum | G06F 9/3001 712/226 |
| 6,167,505 A | * | 12/2000 | Kubota | G06F 9/30149 712/210 |
| 6,687,813 B1 | * | 2/2004 | Norman | G06F 9/30058 712/233 |
| 7,516,061 B1 | * | 4/2009 | Irving | G06F 9/45508 703/23 |
| 7,594,128 B2 | * | 9/2009 | Bacchus | G06F 1/3228 713/300 |
| 2010/0332803 A1 | * | 12/2010 | Yoshida | G06F 9/30101 712/213 |
| 2015/0121048 A1 | | 4/2015 | Lukefahr et al. | |
| 2015/0347144 A1 | * | 12/2015 | Whittaker | G06F 9/30149 712/208 |

(Continued)

FOREIGN PATENT DOCUMENTS

| WO | 96/24895 | 8/1996 |
|---|---|---|
| WO | 2013/098643 | 7/2013 |

OTHER PUBLICATIONS

International Search Report and Written Opinion of the International Searching Authority for PCT/GB2019/050138 dated Apr. 25, 2019, 12 pages.

*Primary Examiner* — Eric Coleman
(74) *Attorney, Agent, or Firm* — Nixon & Vanderhye PC

(57) ABSTRACT

An apparatus and method of operating a data processing apparatus are provided. The data processing circuitry is responsive to a hint instruction to then assert at least one performance modifying control signal, when subsequently generating control signals for other data processing instructions. This causes the data processing functional hardware which performs the data processing operations defined by the data processing instructions to operate in a modified manner, although the data processing results produced do not change in dependence on whether the at least one performance modifying control signal is asserted.

19 Claims, 7 Drawing Sheets

(56) References Cited

U.S. PATENT DOCUMENTS

2015/0378631 A1* 12/2015 Gschwind ........... G06F 9/30047
  711/130
2016/0019184 A1* 1/2016 Hughes .................... G06F 9/30
  711/122
2017/0132011 A1   5/2017 Caulfield et al.

* cited by examiner

HINTS IN A DATA PROCESSING APPARATUS

TECHNICAL FIELD

The present disclosure relates to data processing. In particular, the present disclosure relates to providing operational hints in a data processing apparatus.

DESCRIPTION

A data processing apparatus is caused to carry out selected data processing operations by being provided with a sequence of instructions defining what those data processing operations should be. The instructions must be predefined for a data processing apparatus, this collection of predefined instructions commonly being referred to as its "instruction set". It is, on the one hand, useful for a data processing apparatus to be able to perform many defined data processing operations, but on the other hand this comes at the cost of a corresponding large number of instructions needing to be defined as part of its instruction set. Moreover, where the instructions defined for the instruction set are specified within a limited number of bits, this in turn limits the number of individual instructions which can be defined, and therefore for an instruction to be defined for a given data processing operation requires justification for the use of that "instruction space" within the instruction set. Consequently the number of individual data processing operations for which instructions may be defined is limited. This imposes a constraint on the ability of the programmer of the data processing apparatus to define the data processing operations which it should perform in a concise number of data processing instructions.

SUMMARY

In one example embodiment described herein there is an apparatus comprising decoding circuitry to generate control signals in dependence on a sequence of data processing instructions; and data processing circuitry comprising data processing functional hardware, wherein the data processing circuitry is responsive to the control signals to operate the data processing functional hardware in an operating procedure to perform data processing operations defined by the sequence of data processing instructions to produce data processing results, wherein the decoding circuitry is responsive to a hint instruction preceding the sequence of data processing instructions to assert at least one performance modifying control signal when generating the control signals for the sequence of data processing instructions, and the data processing circuitry is responsive to assertion of the at least one performance modifying control signal to be responsive to the control signals to operate the data processing functional hardware in a modified operating procedure to perform the data processing operations defined by the sequence of data processing instructions to produce said data processing results, wherein the modified operating procedure differs from the operating procedure.

In one example embodiment described herein there is a method of operating a data processing apparatus comprising generating control signals in dependence on a sequence of data processing instructions; operating data processing functional hardware in response to the control signals in an operating procedure to perform data processing operations defined by the sequence of data processing instructions to produce data processing results; asserting at least one performance modifying control signal when generating the control signals for the sequence of data processing instructions in response to a hint instruction preceding the sequence of data processing instructions; and operating the data processing functional hardware in response to assertion of the at least one performance modifying control signal and the control signals in a modified operating procedure to perform the data processing operations defined by the sequence of data processing instructions to produce the data processing results, wherein the modified operating procedure differs from the operating procedure.

In one example embodiment described herein there is an apparatus comprising: means for generating control signals in dependence on a sequence of data processing instructions; means for operating data processing functional hardware in response to the control signals in an operating procedure to perform data processing operations defined by the sequence of data processing instructions to produce data processing results; means for asserting at least one performance modifying control signal when the control signals are generated for the sequence of data processing instructions in response to a hint instruction preceding the sequence of data processing instructions; and means for operating the data processing functional hardware in response to assertion of the at least one performance modifying control signal and the control signals in a modified operating procedure to perform the data processing operations defined by the sequence of data processing instructions to produce the data processing results, wherein the modified operating procedure differs from the operating procedure.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
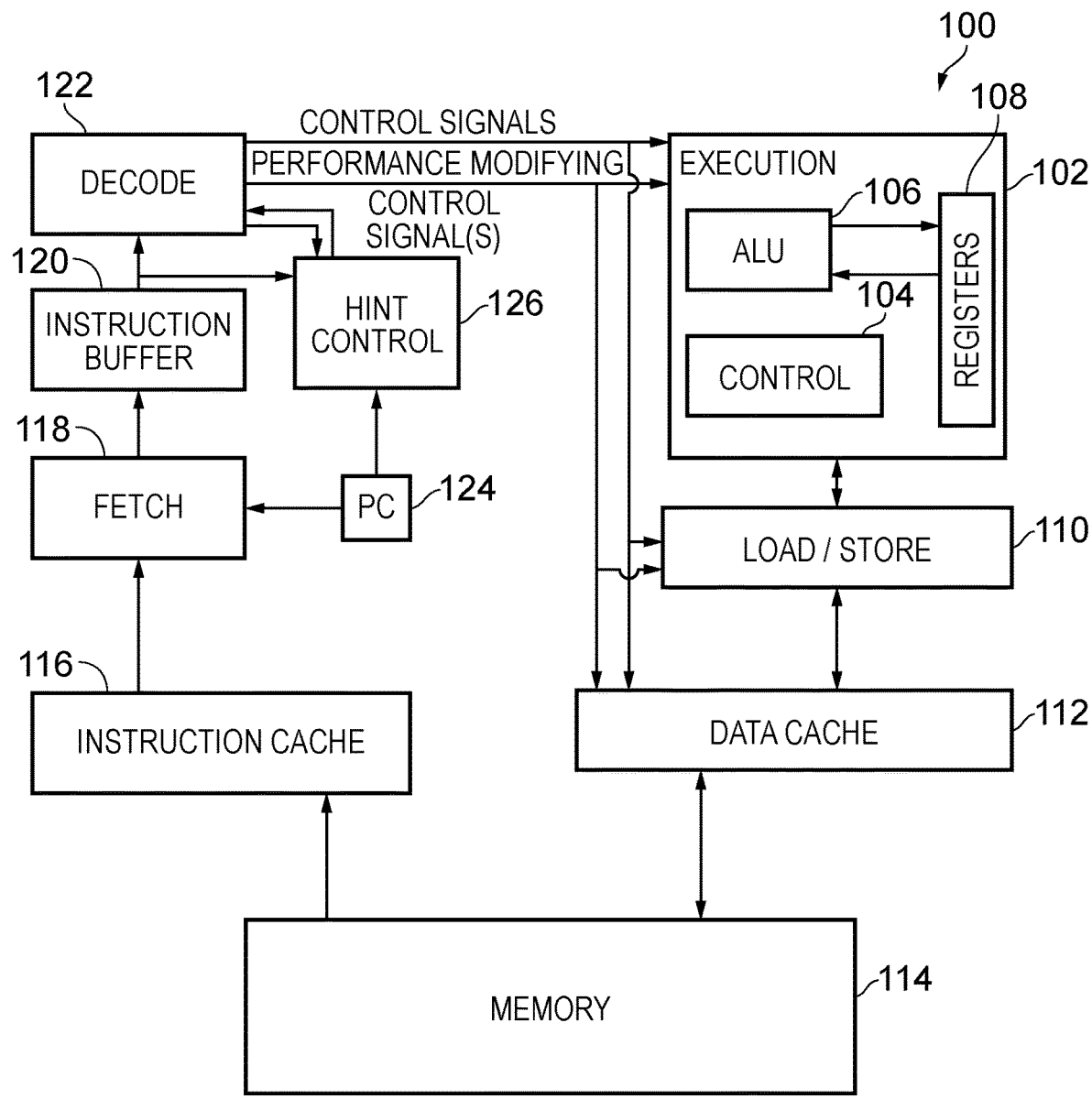
FIG. 1 schematically illustrates a data processing apparatus in one example embodiment.

Before discussing the embodiments with reference to the accompanying figures, the following description of embodiments is provided.

In accordance with one example configuration there is provided an apparatus comprising decoding circuitry to generate control signals in dependence on a sequence of data processing instructions; and data processing circuitry comprising data processing functional hardware, wherein the data processing circuitry is responsive to the control signals to operate the data processing functional hardware in an operating procedure to perform data processing operations defined by the sequence of data processing instructions to produce data processing results, wherein the decoding circuitry is responsive to a hint instruction preceding the sequence of data processing instructions to assert at least one performance modifying control signal when generating the control signals for the sequence of data processing instructions, and the data processing circuitry is responsive to assertion of the at least one performance modifying control signal to be responsive to the control signals to operate the data processing functional hardware in a modified operating procedure to perform the data processing operations defined by the sequence of data processing instructions to produce said data processing results, wherein the modified operating procedure differs from the operating procedure.

The present techniques provide a hint instruction which the programmer of the apparatus can introduce into the sequence of data processing instructions which controls operation of the apparatus. The operation of the apparatus in response to the sequence of data processing instructions is determined by the control signals generated by its decoding circuitry, which in turn depend on the particular sequence of data processing instructions which it receives. Including the hint instruction in the data processing instructions provided to the apparatus causes a modification in how the apparatus responds to data processing instructions which it receives after that hint instruction. In particular, it causes the decoding circuitry to assert at least one performance modifying control signal to bring about this performance modification. It is important to appreciate that where this is a "hint" instruction and where it causes the assertion of a "performance" modifying control signal, the present techniques therefore are not concerned with changing the data processing operations carried out in response to the sequence of data processing instructions in a deterministic manner, i.e. to change the data processing results which the data processing operations produce, but rather are concerned with modifying the manner in which the data processing operations are carried out (in terms of "performance"), such that the data processing operations may, for example, be carried out in a manner for which the efficiency, power consumption, latency, and so on may vary with respect to the manner in which they would have been carried out had the hint instruction not been used. For this reason, as set out in the definition above, the apparatus is arranged to produce the same data processing results whether the sequence of data processing instructions are carried out according to the operating procedure (i.e. not preceded by the hint instruction) or are carried out according to the modified operating procedure (i.e. when preceded by the hint instruction). The same results are produced by either procedure, but the manner in which those results are produced can vary in a range of ways between the operating procedure and the modified operating procedure.

Accordingly, the present techniques provide the programmer, and indeed the instruction set architect, with a mechanism for modifying the manner in which the apparatus responds to one or more data processing instructions which form the sequence of data processing instructions, without having to redefine a number of data processing instructions as part of the instruction set of the apparatus corresponding to that modification in response.

Moreover, although the above description refers to a hint instruction, the present techniques further encompass the provision of multiple hint instructions available to the apparatus programmer, and one or more hint instructions may precede the sequence of data processing instructions in order to apply a particular configuration to the apparatus when it executes the sequence of data processing instructions, specifically by the assertion of the performance modifying control signals generated when the instructions are decoded. Thus an approach is provided which avoids the need to extend the instruction set with multiple different versions of each defined data processing instruction (to account for the modified manner in which one or more data processing instructions are carried out when preceded by a hint instruction). The combinatorial variants that may be achieved by the assertion of a selection of hint instructions gives variety to the manner in which the apparatus can be caused to carry out its data processing operations defined by the sequence of data processing instructions, with only a small extension to the instruction set (to define the one or more hint instructions) being required.

Merely for the purposes of providing an illustrative example, one use case of these hint instructions is in the application of non-temporal behaviour to memory operations. Non-temporal memory instructions are a variant of load and store operations, where the accessed data is not expected to be accessed again soon and therefore does not need to be retained in the caches.

Another illustrative example of the use of a memory hint is to disable prefetch training on a given load event. For example, pointer chasing workloads are known to be adversarial to prefetching and can pollute prefetch training structures. Thus, bypassing training for these load events improves overall prefetch performance.

The manner in which the hint instruction affects the subsequent performance of the sequence of data processing instructions may take a variety of forms. In some embodiments the hint instruction defines a number of subsequent instructions for which the at least one performance modifying control signal is to be asserted. In other words, after the hint instruction has been decoded, that number of subsequent instructions will be executed with the at least one performance modifying control signal being asserted, until that number is reached, and then the effect of the hint instruction is switched off. This provides the apparatus programmer with the ability to apply the hint instruction to a defined set of subsequent instructions.

The manner in which the number of subsequent instructions is defined by the hint instruction may take a variety of forms, but in some embodiments the hint instruction defines the number of subsequent instructions for which the at least one performance modifying control signal is to be asserted with reference to a hint assertion vector, wherein each bit in the hint assertion vector corresponds to an instruction in the number of subsequent instructions. This approach therefore provides a still further level of granularity with which the hint instruction may be applied to the number of subsequent instructions, in that by appropriate settings of the bits in the hint assertion vector, a selected (freely definable) subset of the subsequent instructions can be made subject to the at least one performance modifying control signal, whilst by mutual exclusion not setting the remainder of the bits in the hint assertion vector means that this complementary subset of subsequent instructions will not be executed with the at least one performance modifying control signal being asserted.

In some embodiments the apparatus further comprises count circuitry to maintain a count of instructions for which the at least one performance modifying control signal has been asserted. This further supports embodiments in which the hint instruction should be implemented for a defined number of subsequent instructions following the hint instructions. The particular configuration which the count circuitry takes may take a variety of forms. Whilst the hint instruction may cause the at least one performance modifying control signal to be asserted for all data processing instructions which follow it (potentially up to a predetermined count of instructions as mentioned above), in some embodiments the hint instruction defines a type of instructions for which the at least one performance modifying control signal is to be asserted. It will be recognised that instructions may be variously categorised into types, depending on the particular system requirements, and therefore the type of instruction defined by the hint instruction in such embodiments may take a variety of forms. However, merely by way of illustrative example, the type could be memory access instructions, or indeed certain sub-types of memory access instructions, and so on.

As will be clear from the above discussion, the present techniques encompass embodiments in which a number of different performance modifying control signals can be asserted in response to one or more hint instructions, and in this context in some embodiments the hint instruction provides a hint type vector, wherein the hint type vector identifies which of plural performance modifying control signals are to be asserted. In other words, the apparatus can be provided with a set of hint types, and the hint instruction may select from amongst these hint types by the mechanism of the hint type vector, where for example particular bits set within the hint type vector identify which of the plural performance modifying control signals are to be asserted.

In some embodiments the hint instruction specifies a program counter value and the decoding circuitry is responsive to the hint instruction to assert at least one performance modifying control signal until the program counter value is reached. This means that instead of (or in addition to) the hint instruction specifying a number of subsequent instructions for which the at least one performance modifying control signal is to be asserted, the programmer can use the hint instruction to specify a particular point in the instructions provided to the apparatus at which assertion of the at least one performance modifying control signal should cease. It may be useful to specify this in terms of a program counter value because of the logical link this has with the structure of a program provided to the apparatus.

Whilst the above described embodiments have focused on the assertion of the at least one performance modifying control signal, in some embodiments the decoding circuitry is responsive to a hint ending instruction to cease assertion of the at least one performance modifying control signal. This then provides the programmer with an additional tool for the control of the assertion of the at least one performance modifying control signal, namely enabling the assertion to be explicitly ended, regardless of any other mechanisms currently active in association with the hint instruction which cause assertion (counting, hint types, PC value, and so on).

The manner in which the at least one performance modifying control signal is generated and asserted may take a variety of forms, but in some embodiments the decoding circuitry is responsive to the sequence of data processing instructions to generate a sequence of decoded data processing instructions, and the decoding circuitry is responsive to the hint instruction to modify decoding of the sequence of data processing instructions to generate a modified sequence of decoded data processing instructions. Thus encountering the hint instruction may cause the decoding circuitry to modify its decoding of the subsequent sequence of data processing instructions, such that the decoded data processing instructions which it generates are modified in some way. For example, it may be the case that where the data processing instructions received by the decoding circuitry are in a particular format, e.g. defined within a characteristic bit length for the apparatus architecture, such as 16-bit, 32-bit, 64-bit, etc., the decoding circuitry "unpacks" the instructions to generate decoded data processing instructions which are typically longer, and the assertion of the performance modifying control signal may be implemented by affecting the unpacked decoded data processing instructions which result from the decoding of the sequence of data processing instructions.

These decoded data processing instructions may be handled in a variety of ways within the apparatus, but in some embodiments the apparatus further comprises at least one cache storage to store decoded data processing instructions. This at least one cache storage may itself take a variety of forms, but in some embodiments the at least one cache storage is at least one of a micro-op cache, an L0 cache, and a loop cache. These types of caches, which are typically embodied in a closely integrated manner with the data processing circuitry of such apparatus, for example closely associated with a processor core, may benefit from the present techniques by allowing the modified sequence of decoded data processing instructions to be held in a manner closely coupled to the data processing circuitry.

In some embodiments the apparatus further comprises content addressable memory storage to store entries comprising indications of plural program counter values and at least one associated performance modifying control signal to be asserted when an instruction matching one of the indications of the plural program counter values is encountered. The use of such content addressable memory storage enables the apparatus to monitor the program counter values which it encounters and to assert an associated performance modifying control signal with at least one of those program counter values when encountered.

Such embodiments may further provide indications of thread identifiers and/or process identifiers, to allow a finer level of control over the context in which the at least one associated performance modifying control signal is asserted. Hence, in some embodiments entries of the content addressable memory storage further comprise an indication of a thread identifier, wherein the decoding circuitry further requires the indication of the thread identifier to match a current thread to assert the at least one associated performance modifying control signal. Similarly in some embodiments entries of the content addressable memory storage further comprise an indication of a process identifier, wherein the decoding circuitry further requires the indication of the process identifier to match a current process to assert the at least one associated performance modifying control signal.

Such a content addressable memory may be provided at various locations within the apparatus, but in some embodiments the content addressable memory storage with provided on a parallel path to an instruction cache. This means that whilst instructions pass through the instruction cache they may in parallel be compared against the content addressable memory (or at least their program counter values may be compared against the content addressable memory) and thus the provision of the content addressable memory in its associated techniques should not affect timing of the apparatus, because of this parallel access.

The present techniques are not limited in the manner in which the performance modifying control signals may modify the manner in which the data processing functional hardware operates and accordingly in embodiments the data processing circuitry is responsive to assertion of the at least one performance modifying control signal to modify a manner in which at least one of:

caching;
prefetching;
branch prediction;
decode width selection;
instruction caching;
atomic memory transacting;
memory transaction order constraining; and
dynamic binary translation is carried out in the apparatus in the modified operating procedure with respect to the operating procedure.

The data processing operations carried out by the data processing functional hardware are defined by the sequence of data processing instructions and thus, generally, modification of the sequence of data processing instructions will result in modified data processing results. However, the present techniques recognise that this is not universally true, in that an instruction set may define instructions which only affect architectural state and not program state. For example, a software prefetch instruction may be defined, which can give the programmer control over whether prefetching is carried out or not, but use of this instruction will not change the data processing results produced by the sequence of data processing instructions. In this context the present techniques may be implemented by defining whether or not such an instruction is carried out, since this also allows the above-discussed performance modification (without affecting the data processing results) to be achieved. Accordingly in embodiments in the data processing circuitry is responsive to assertion of the at least one performance modifying control signal to omit at least one data processing operation defined by a data processing instruction in the sequence of data processing instructions, to produce said data processing results unmodified by omission of the data processing instruction.

In accordance with another example configuration there is provided a method of operating a data processing apparatus comprising generating control signals in dependence on a sequence of data processing instructions; operating data processing functional hardware in response to the control signals in an operating procedure to perform data processing operations defined by the sequence of data processing instructions to produce data processing results; asserting at least one performance modifying control signal when generating the control signals for the sequence of data processing instructions in response to a hint instruction preceding the sequence of data processing instructions; and operating the data processing functional hardware in response to assertion of the at least one performance modifying control signal and the control signals in a modified operating procedure to perform the data processing operations defined by the sequence of data processing instructions to produce the data processing results, wherein the modified operating procedure differs from the operating procedure.

In accordance with another example configuration there is provided an apparatus comprising means for generating control signals in dependence on a sequence of data processing instructions; means for operating data processing functional hardware in response to the control signals in an operating procedure to perform data processing operations defined by the sequence of data processing instructions to produce data processing results; means for asserting at least one performance modifying control signal when the control signals are generated for the sequence of data processing instructions in response to a hint instruction preceding the sequence of data processing instructions; and means for operating the data processing functional hardware in response to assertion of the at least one performance modifying control signal and the control signals in a modified operating procedure to perform the data processing operations defined by the sequence of data processing instructions to produce the data processing results, wherein the modified operating procedure differs from the operating procedure.

Particular embodiments will now be described with reference to the figures.

FIG. 1 illustrates a data processing apparatus 100 in accordance with one embodiment. This apparatus 100 is schematically illustrated as comprising execution circuitry 102, which will be recognised as the component of the apparatus which will execute the instructions provided to it by the apparatus programmer. It will further be recognised by one of ordinary skill in the art that, merely for the purposes of clarity, the components of the apparatus 100 are only shown schematically and at a relatively gross level of detail, with one of ordinary skill in the art being familiar with the many different ways in which components of a data processing apparatus such as execution circuitry 102 might be configured. Accordingly, further detail of the configuration of such components is dispensed with here for brevity. Nevertheless, as shown in FIG. 1, the execution circuitry 102 is shown to comprise control circuitry 104 which maintains overall control of the execution circuitry 102, as well as an instance of ALU circuitry 106 (arithmetic logic unit). The ALU circuitry 104 is provided here as an example of data processing functional hardware within the execution circuitry 102, but one of ordinary skill in the art will be familiar with many different varieties of data processing functional hardware which may form part of execution circuitry 102. The ALU 106 performs its data processing operations with respect to data values held in the registers 108. Further, the content of the registers 108 are loaded from and stored to storage outside the execution circuitry by means of the load/store circuitry 110. Data values may be temporarily cached in the data cache 112 (which may in fact comprise a hierarchy of data cache levels), whilst long term storage for the data values is provided by the memory 114. The memory 114 is also the storage location for the data processing instructions which the apparatus programmer provides to configure the data processing operations which the apparatus should carry out. These instructions are retrieved from the memory by means of the fetch circuitry 118, and may be cached in instruction cache 116 (which may in fact be a hierarchy of instruction caches). Typically the fetch circuitry 118 retrieves instructions from memory 114 in sequence, the current instruction of the instructions being identified by a program counter (PC) value provided to it by program counter circuitry 124. Instructions retrieved from the instruction cache 116 or the memory 114 may be temporarily buffered in an instruction buffer 120 before being decoded by decoding circuitry 122. The instructions retrieved by the fetch circuitry 118 and decoded by the decoding circuitry 122 specify the data processing operations which are carried out by the execution circuitry 102, and indeed can control the operation of any other instruction-configurable component of the apparatus 100. This control is mediated between the decoding circuitry 122 and the execution circuitry 102 by control signals and it should be noted that these control signals may also control other instruction-configurable components of the apparatus 100 and FIG. 1 illustrates the example of these control signals also potentially being received by the load/store circuitry 110 and the data cache 112. Of particular relevance to the present disclosure is the additional provision in the apparatus 100 of the hint control circuitry 126 which also receives the PC value from the program counter 124 as well as an indication of the instructions passed from the instruction buffer 120 to the decoding circuitry 122. The hint control circuitry 126 also receives information about the decoding operations of the decode circuitry 122. Indeed the signals received from the decode circuitry by the hint control circuitry are themselves control signals, namely those deriving from a decoded hint instruction.

In response (as will be described in more detail with reference to the figures which follow) the hint control circuitry 126 can signal to the decode circuitry 122 to cause it to assert certain performance modifying control signals in parallel with the control signals which it asserts for each instruction decoded. In fact it should be appreciated that the "control signals" and the "performance modifying control signals" which the decoding circuitry asserts may all be considered as a variety of "control signal", but are given these distinct labels here to facilitate the present discussion. In particular the hint control circuitry 126 is arranged to identify when a hint instruction is passed from the instruction buffer 120 to the decoding circuitry 122 and on that basis to cause the decoding circuitry 122 to assert certain performance modifying control signals which then influence the manner in which subsequent instructions are executed by the data processing functional hardware of the apparatus, such as the execution circuitry 102, the load/store circuitry 110 and the data cache 112. An important point to appreciate here is that whether or not the one or more performance modifying control signals are asserted by the decoding circuitry 122, whilst this may modify the manner in which the data processing operations defined by data processing instructions are carried out, this will not change the data processing results of those data processing operations. In other words, the data processing results which are produced as a consequence of the data processing instructions (other than the hint instruction) which the decoding circuitry receives do not change in dependence on when one or more control signals are asserted. The data processing results thus remain the same (dependent only on the data processing instructions received and the data values to which those instructions refer). Further detail of such performance modifying control signals, and in particular the types of "performance" which they may affect, are discussed with reference to the figures which follow.

FIGS. 2A, 2B, 3A, and 3B schematically illustrate example configurations of hint control circuitry such as hint control circuitry 126 of FIG. 1. Although these are illustrated in four separate figures, it is important to appreciate that these embodiments are not mutually exclusive and the components shown in one or more of these four figures may be present in a given instance of the hint control circuitry, depending on the particular configuration it has.

Figure 2A:
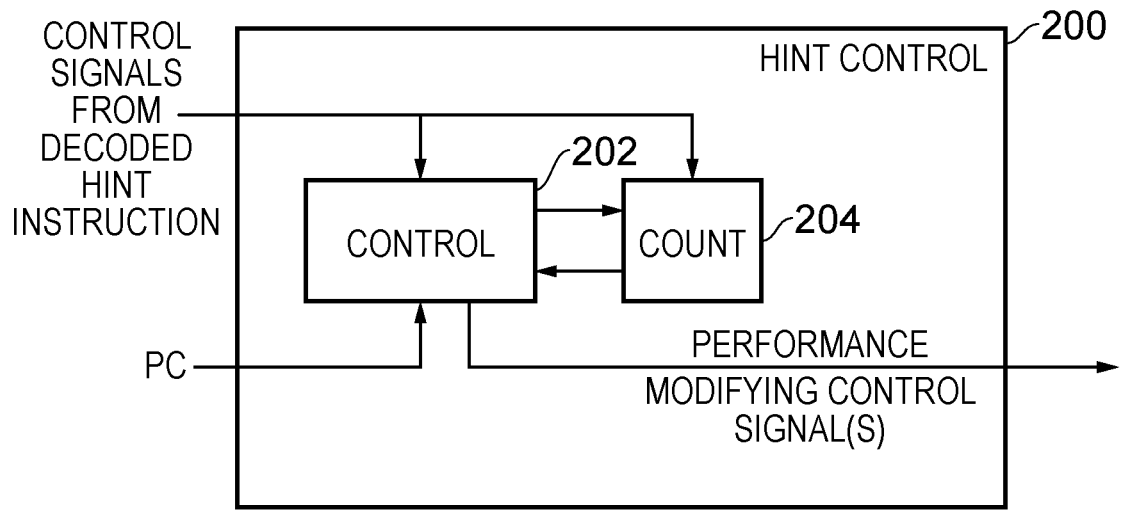
FIGS. 2A, 2B, 3A, and 3B schematically illustrate hint control circuitry provided to generate one or more performance modifying control signals in dependence on control signals received as a result of decoding a hint instruction in respective example embodiments.

FIG. 2A schematically illustrates hint control circuitry 200 which comprises control circuitry 202 and count circuitry 204. In this embodiment the control signals from the decoded hint instruction cause the control circuitry 202 and the count circuitry 204 to operate such that the count circuitry is reset to either a predetermined value or to a value defined by the hint instruction. Then subsequently for each instruction which is decoded (note that the control circuitry 202 may additionally receive an indication of the program counter (PC) value, which can be used to follow instruction progress, although this is not essential, since the counter may also simply be updated for each instruction) the count value held by the count circuitry 204 is modified (for example being incremented or decremented as appropriate). Whilst this counting continues the control circuitry 202 causes one or more performance modifying control signals to be asserted. Once the count reaches a predetermined limit (e.g. is incremented as far as a specified value or decrements to 0) then this causes the control circuitry 202 to switch off the one or more performance modifying control signals again.

Figure 2B:
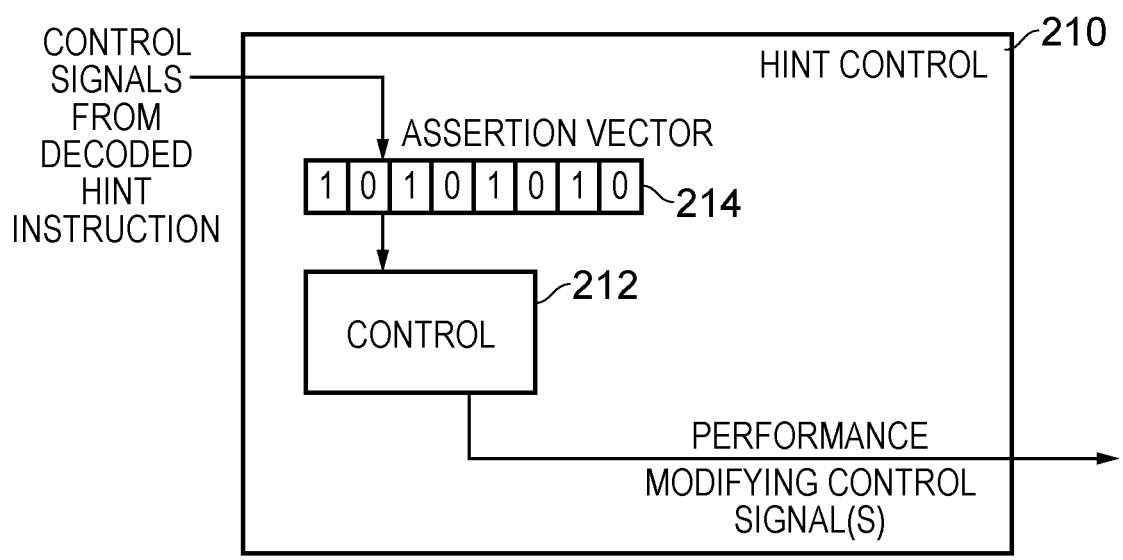

FIG. 2B schematically illustrates an embodiment in which hint control circuitry 210 also comprises control circuitry 212 which is responsive to an assertion vector (a hint assertion vector) which is received in the form of control signals from the decoded hint instruction. Indeed this set of bits may be directly copied from the hint instruction and temporarily stored within the hint control circuitry 210 in dedicated storage 214, although this may also form part of the control circuitry 212. This assertion vector 214 indicates a selection from amongst a number of performance modifying control signals which the control circuitry 212 can assert, which the decoded hint instruction has indicated should now be asserted.

Figure 3A:
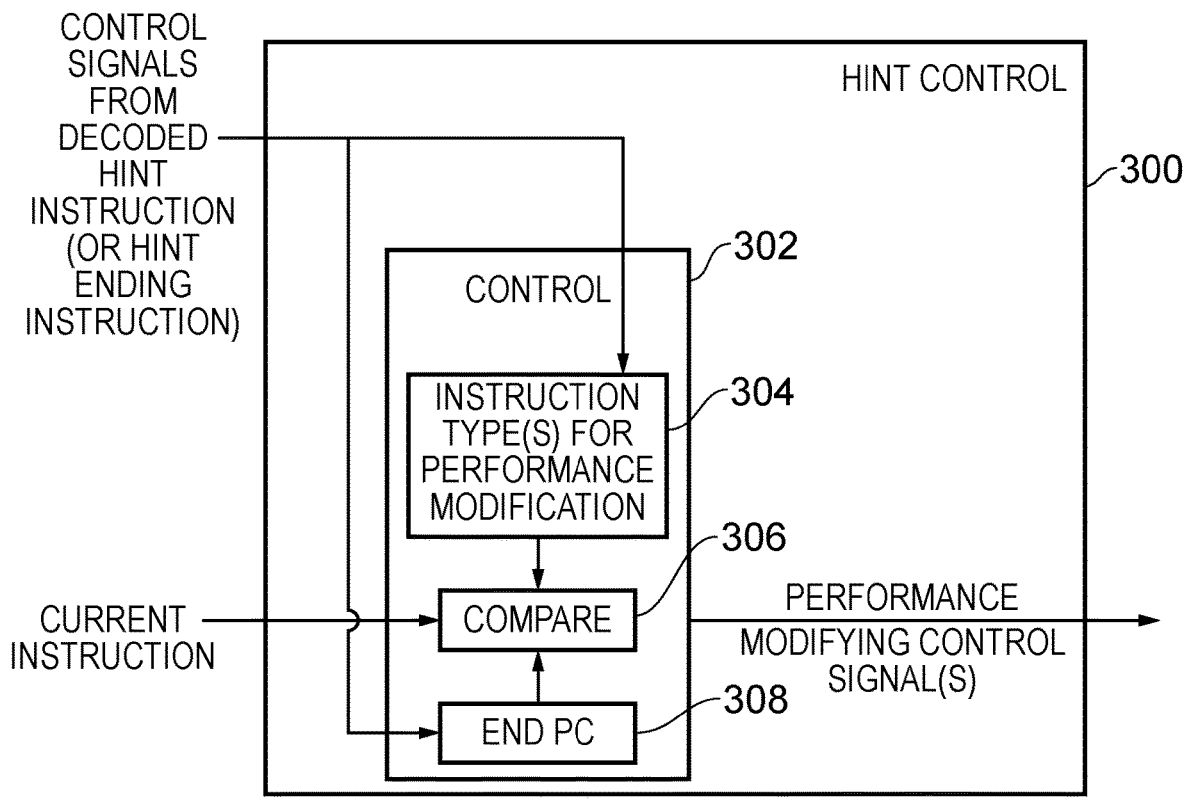

FIG. 3A schematically illustrates hint control circuitry 300 that comprises control circuitry 302. The control circuitry 302 stores a set of one or more instruction types for which performance modification may be asserted and this itself may be configured by a decoded hint instruction, or a hint ending instruction, such that the programmer can control a sequence of instructions beginning after the provision of the hint instruction and possibly concluding with a hint ending instruction) for which one or more instruction types should have performance modifying control signals asserted. The control circuitry 302 further comprises comparison circuitry 306 which receives an indication of these activated instruction types from circuitry 304 and also receives an indication of the current instruction (i.e. the PC). When these match (i.e. when the current instruction is identified as being one of the specified types) this causes the control circuitry 302 to assert one or more performance modifying control signals. Control circuitry 302 is also shown to comprise storage for an end PC 308 which can be set by means of an appropriate hint instruction, such that performance modifying control signals are asserted until a particular program counter value is reached and the comparison circuitry 306 also receives this end PC value in order to implement this by comparison.

Figure 3B:
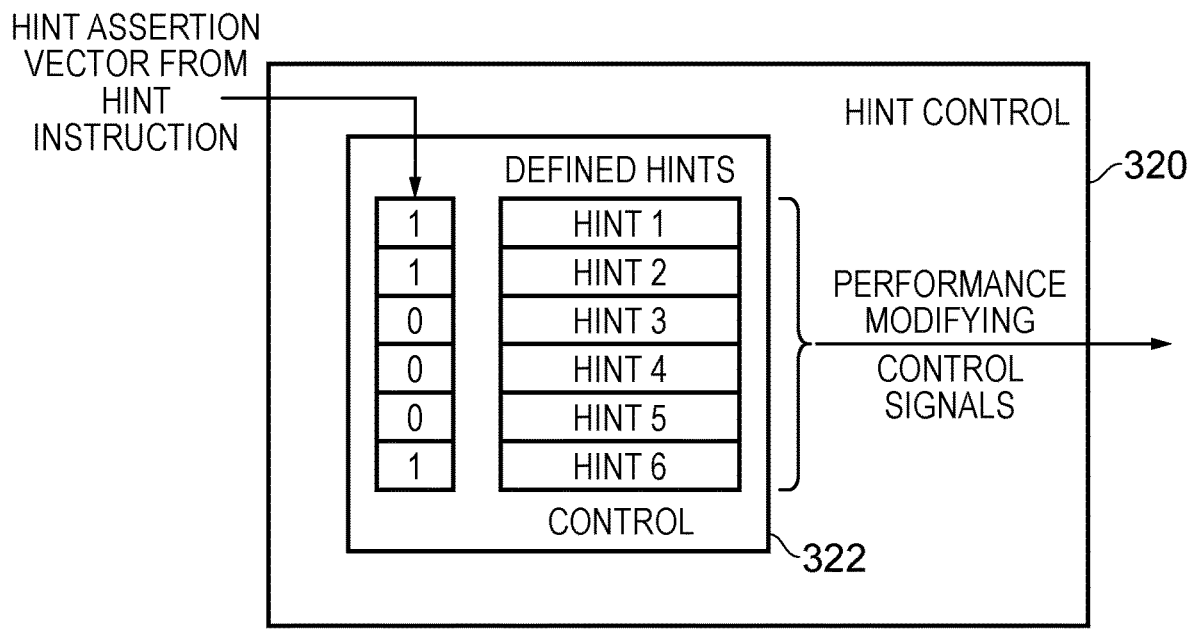

FIG. 3B schematically illustrates hint control circuitry 320 which comprises control circuitry 322. The control circuitry 322 has storage for a set of defined hints and also receives a hint assertion vector from a hint instruction (by means of the control signals received from the decoding circuitry). The length of the hint assertion vector matches the number of defined hints within the control circuitry 322 and thus this provides a mechanism by which a hint instruction can cause one or more of the defined hints to be activated and on this basis the control circuitry 322 asserts one or more performance modifying control signals. Thus in the example shown hints 1, 2 and 6 are activated, whilst hints 3, 4 and 5 are not.

Figure 4:
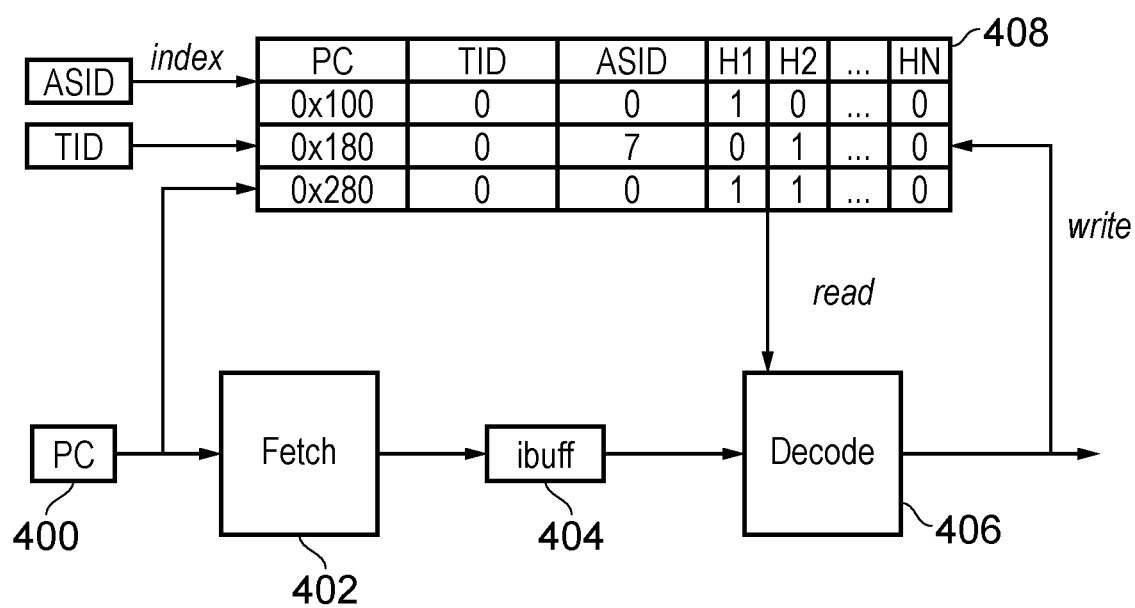
FIG. 4 schematically illustrates content addressable memory storage to store an instruction-modifying table in one example embodiment.

FIG. 4 schematically illustrates certain components within an apparatus of one embodiment. These comprise, as in the example of FIG. 1, a program counter 400, fetch circuitry 402, an instruction buffer (ibuff) 404, and decoding circuitry 406. Additionally provided here is an instance of content addressable memory 408, also referred to herein as an "instruction modifying table (IMT)". This content addressable memory 408 is provided in parallel to the chain of the program counter 400, the fetch circuitry 402, the instruction buffer 404, and the decoding circuitry 406, such that for each program counter indication generated by the program counter circuitry 400 this is not only received by the fetch circuitry 402, but also by the content addressable memory 408. Each entry (line) within the content addressable memory 408 comprises a program counter value indicating a hinted instruction for which one or more hints should be applied. Each entry also comprises a thread identifier (TID) and an address space identifier (ASID). The use of the thread identifier prevents a thread from reading an entry written by another thread in the same process. For example this could happen after a context switch and in a simultaneous multi-threaded (SMT) core. This enables the same instruction used in different threads to behave differently. Similarly the ASID can be used to prevent a process from reading information written by another process. This could also happen after a context switch. Note that if this feature is not included it may be desirable that the table is flushed on a context switch to prevent such pollution. The remaining part of each entry comprises one bit per defined performance hint (H1, H2, . . . HN) where the setting a bit corresponding to each hint is used to cause that hint to be asserted. As shown in FIG. 4 the content of the content addressable memory is read out and forms a further input to the decode circuitry 406, such that the hint of information corresponding to an instruction is added to the instruction signals after decoding and is then propagated through the pipeline as in the case of the specific instruction without any hint in.

One typical context in which the IMT might be used would be before a loop with one or more hinted instructions. When the loop executes, the hinted instructions will behave in the performance modified manner following the hint information written in the IMT without the need for additional instructions (i.e. there is no instruction overhead within the loop). Note that an IMT with all the features illustrated in FIG. 4 is not required in some embodiments, and the hinting could be tracked with a simplified version of the IMT, without specific entries for a particular PC, but with just one entry per ASID-TID pair. Instructions in the block for which the hint does not apply remain unmodified. In such an embodiment there might additionally be provided a separate mechanism to control when the hinted behavior would stop. For example an "End PC" indication or count mechanism, such as described above with respect to the previous figures, may be used.

As mentioned above, example use cases of these hint instructions are in the application of non-temporal behaviour to memory operations and to disable prefetch training on a given load event. Note that through the present techniques, both hints can be provided simultaneously and associated with multiple instructions or a region of code merely by extending the instruction set by a hint instruction. This is in contrast to contemporary techniques which would require extending the ISA with replicated versions of all "hint-affected" instructions to incorporate all combinatorial variants (i.e. apply no hint, apply only one or the other, or apply both hints) of these hints. This is a high cost. Consider the following examples:

One such hint instruction could have the following form:
hint <hint_vector>, <range>
where <hint_vector> is a value that identifies a hint vector and <range> is the relative offset in number of instructions to which the hint will be applied. In a loop traversing an array of pointers, it could be used as follows:

```
...
hint (NON_TEMPORAL | DISABLE_PREFETCH_TRAINING),
loop_end
loop_start:
    ld1d     z1.d, p1/z, [x9, x8, lsl #3]    // array access
    incd     x8
    ld1w     z1.d, p1/z, [x11, z1.d]         // pointer access from array
    /*do some work */
    whilelt  p1.d, x8, x10
    b.mi     loop_start
loop_end:
...
```

This approach can be extended in many ways. For example, instruction classes and vector-based enable flags are two extensions that may provide flexibility and finer-grained control over hint application. An example of this is:
mem_hint <mem_hint_vector>, <enable_vector>
With this instruction, the same sample code above could be modified such that neither load within this loop body would be cached (both treated as non-temporal), but the array accesses would get directed to the prefetcher under the default behaviour, while the pointers would not.

```
...
mem_hint (NON_TEMPORAL), 0b11000000         // hint on both
loads in the loop
mem_hint
(DISABLE_PREFETCH_TRAINING), 0b01000000    //only hint
on the second load
loop_start:
    ld1d     z1.d, p1/z, [x9, x8, lsl #3]
    incd     x8
    ld1w     z1.d, p1/z, [x11, z1.d]
    /*do some work */
    whilelt  p1.d, x8, x10
    b.mi     loop_start
loop_end:
...
```

Note that depending on the particular hardware implementation complexity, these vectors could be applied to static instructions (as shown) or dynamically during execution (by pushing the hints into the head of the loop body). Each version has different trade-offs in cost and performance. Further, note that the prefetching behaviour which is thus controlled by a hint instruction could be a default hard-wired behaviour of the apparatus, or could be prefetching behaviour triggered by a prefetch instruction. In the latter case the use of the hint instruction can thus, for example, turn off the prefetch instruction, as though it does not form part of the sequence of instructions being carried out. Conversely, the use of the hint instruction could equally effectively turn on the prefetch instruction, as though it originally formed part of the sequence of instructions being carried out.

Turning now to FIGS. 5A, 5B, 6A, and 6B, these schematically illustrate example configurations of data processing functional hardware which are the recipients of control signals to perform data processing operations defined by the sequence of data processing instructions. They are also the recipients of performance modifying control signals to perform the data processing operations in a modified manner (which still nevertheless produces the same results). Although these are illustrated in four separate figures, it is important to appreciate that these embodiments are not mutually exclusive and the components shown in one or more of these four figures may be present in a given apparatus implementing the present techniques, depending on the particular configuration it has.

Figure 5A:
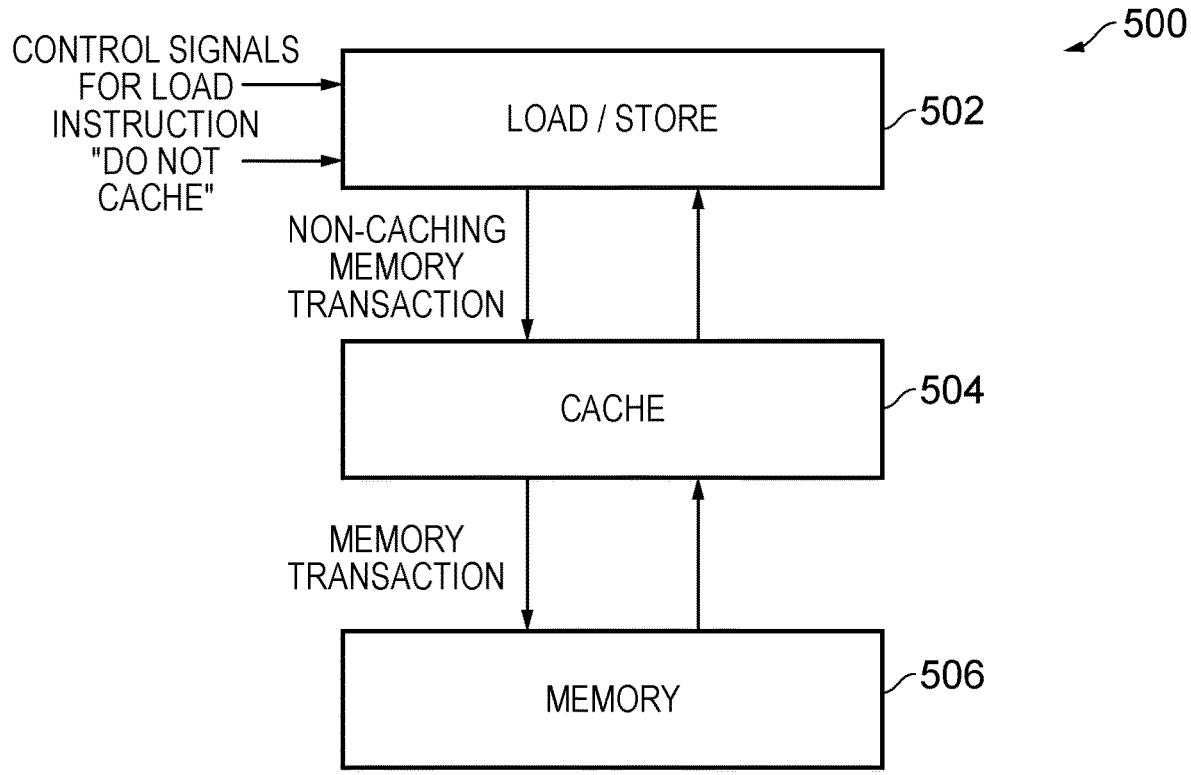
FIGS. 5A, 5B, 6A, and 6B schematically illustrate functional hardware of a data processing apparatus, the operation of which can be modified in dependence on control signals which it receives in respective example embodiments.

FIG. 5A schematically illustrates a set of components 500 comprising a load/store unit 502, a cache 504, and a memory 506. The load/store unit receives control signals, which in this example are labelled in the example of performance modifying control signals for a load instruction (comprising a "do not cache" signal). The load/store unit 502 then issues a non-caching memory transaction to the memory system, which causes the required data item to be retrieved from the memory 506, but not cached in the cache 504. This example therefore illustrates a situation in which under normal circumstances the action of the load/store unit 502 would typically cause a data line to be brought into the cache, but the performance modifying control signals have suppressed this. Another example would be to insert data in the cache, but with a low priority in the cache replacement policy so the data will be replaced the next time a cache line slot is needed to be replaced.

Figure 5B:
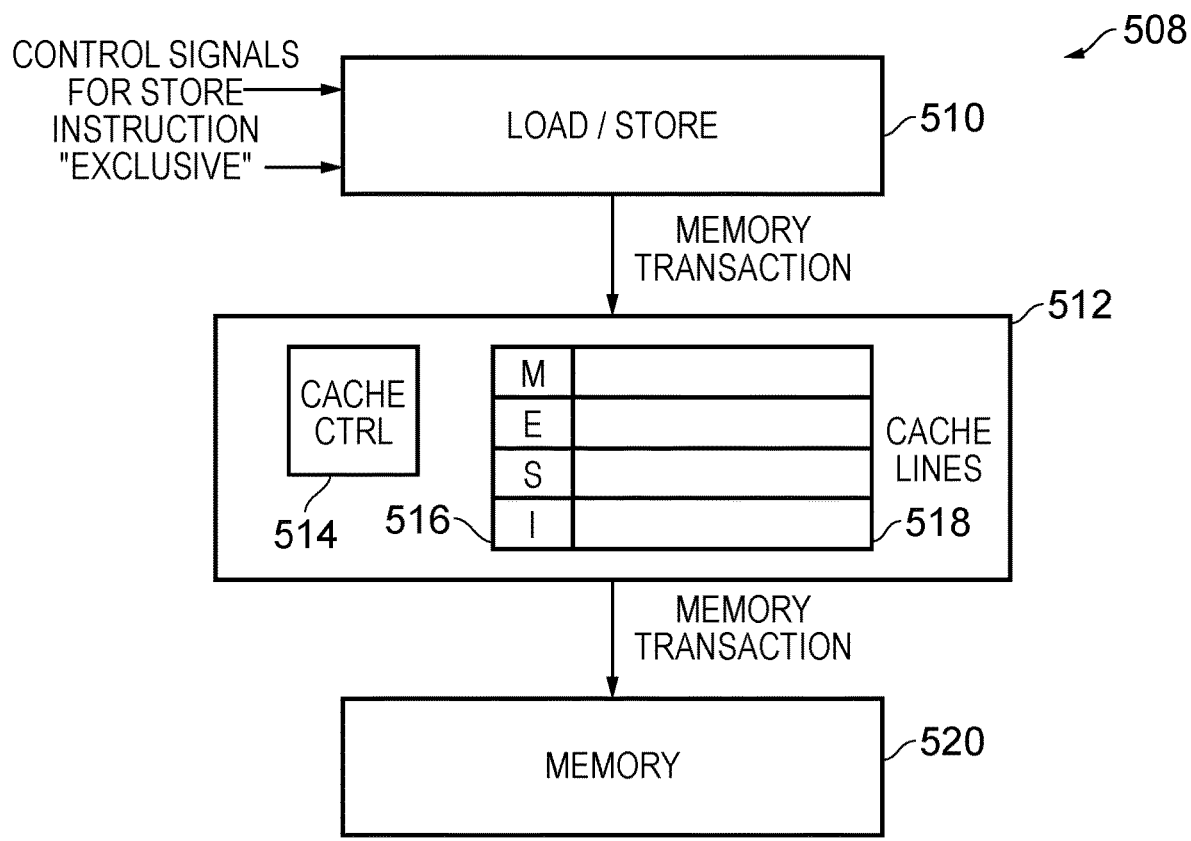

FIG. 5B schematically illustrates a set of components 508 also comprising a load/store unit 510, a cache 512, and a memory 520. The load/store unit in this example receives control signals, which are labelled as comprising an "exclusive" signal. The load/store unit 510 issues a memory transaction to the memory system, which causes the corresponding entry in a cache line 518 of the cache 512 (under the control of the cache control (CTRL) 514) to be marked as in "exclusive" state for the "MESI" (modified/exclusive/shared/invalid) for the cache coherence protocol being implemented. Clearly the performance modifying control signals received could also specify others of these states (as permitted by the protocol), or indeed a different cache coherence protocol could be implemented.

Figure 6A:
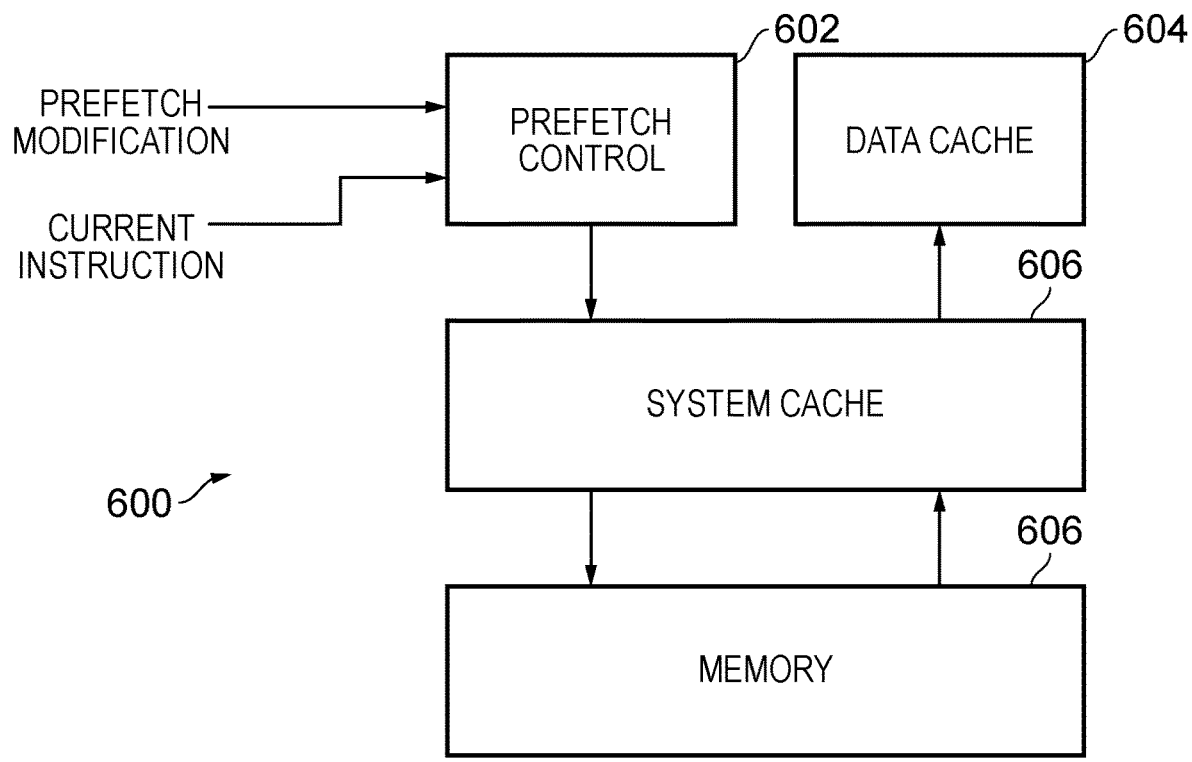

FIG. 6A schematically illustrates a set of components 600 comprising prefetch control 602, a data cache 604, a system cache 606, and a memory 608. The actions of prefetch control circuitry are familiar to one of ordinary skill in the art. However according to the present techniques the prefetch control circuitry 602 may receive a prefetch modification (i.e. a performance modified control signal) as shown in the figure. This can for example disable prefetch training on a given load event as discussed above.

Figure 6B:
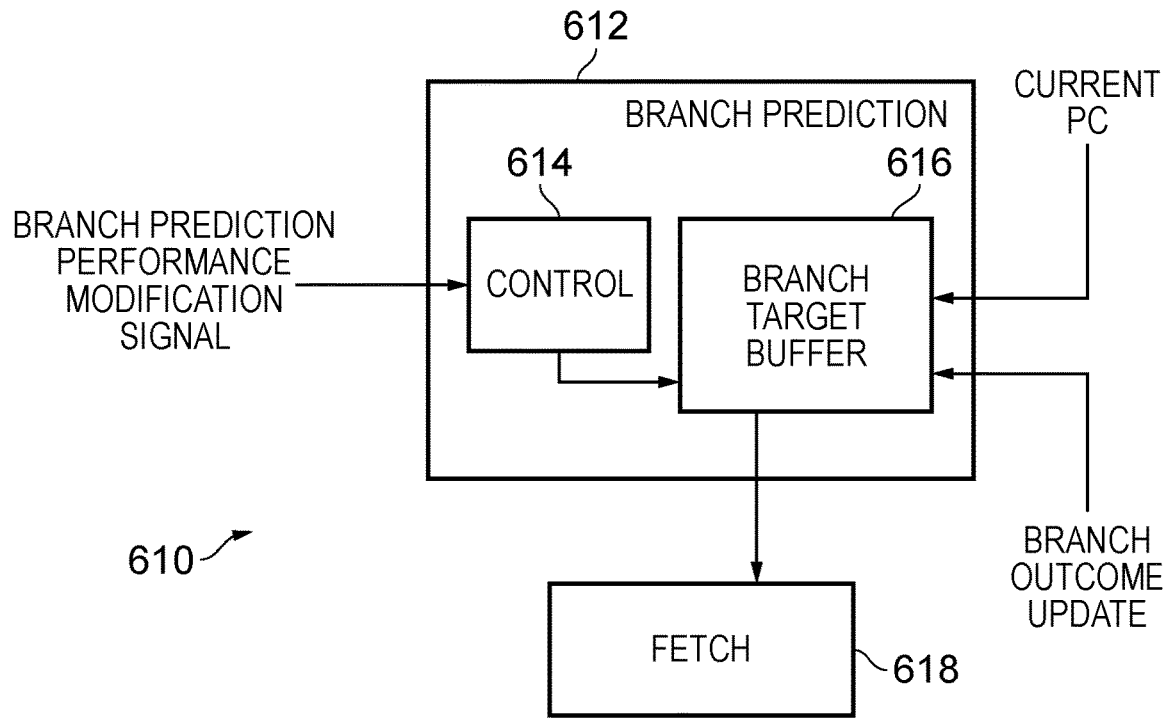

FIG. 6B schematically illustrates a set of components 610 comprising branch prediction circuitry 612 and fetch circuitry 618. As will be familiar to one of ordinary skill in the art the branch prediction circuitry comprises control circuitry 614 and a branch target buffer 616. However according to the present techniques the control circuitry 614 may receive a branch prediction performance modification signal as shown in the figure. This can modify the behaviour of branch prediction circuitry 612 and in particular alter which branch targets are stored in the branch target buffer 616.

Figure 7:
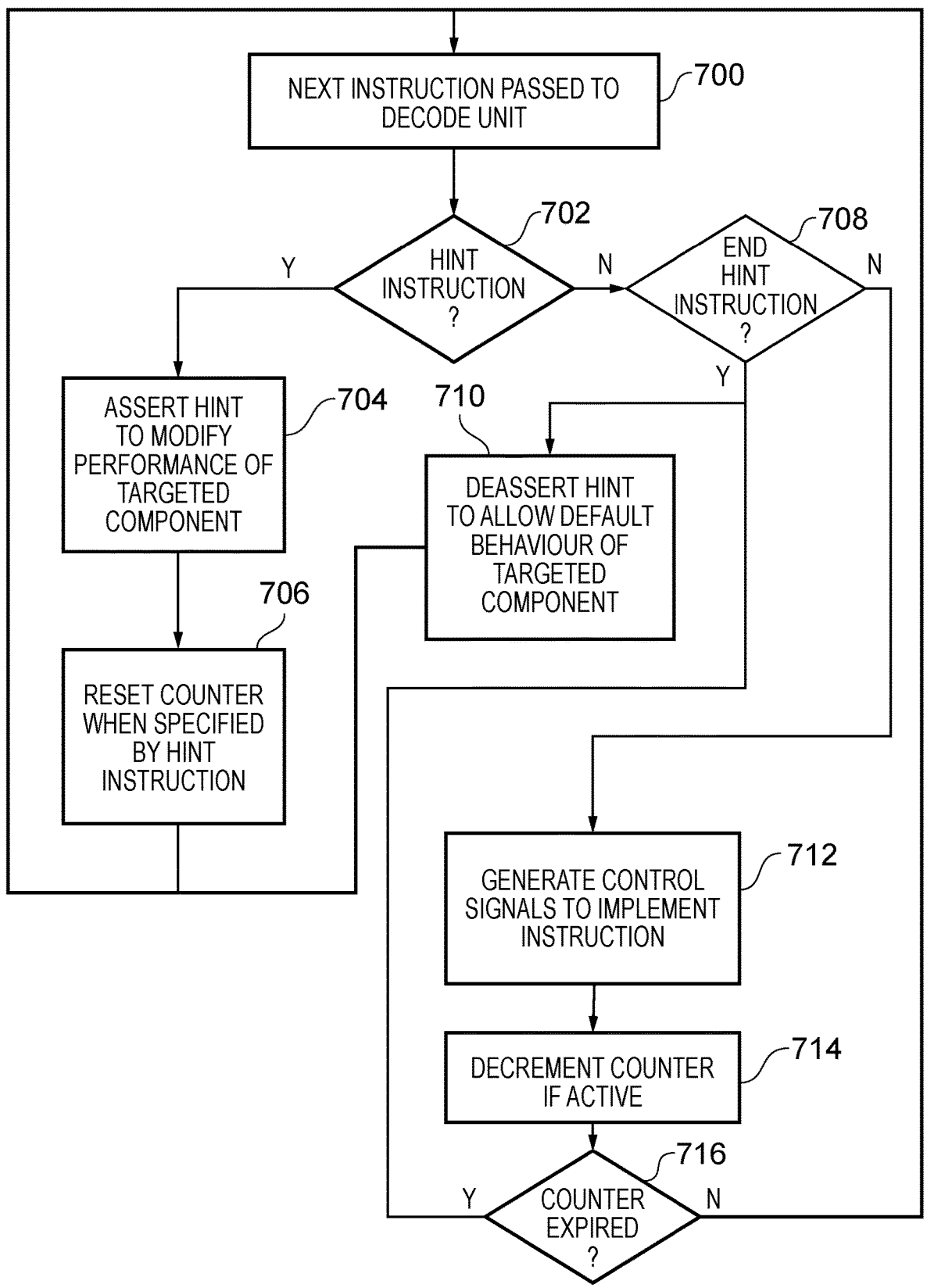
FIG. 7 is a flow diagram showing a sequence of steps which are taken in the method of one example embodiment.

FIG. 7 shows a flow diagram comprising a sequence of steps are taken in one embodiment of the present techniques. The flow can be considered to begin at step 700 where the next instruction is passed to the decode unit. Then at step 702 it is determined if this is a hint instruction. If it is the flow proceeds to step 704 where the hint is asserted to modify the performance of the targeted functional hardware component. It will be appreciated from the above discussion that this occurs by asserting one or more performance modification signals to affect the manner in which the targeted component carries out its data processing operations. At step 706 a counter is reset when this is specified by the hint instruction and the flow then returns to step 700. Returning to a consideration of step 702, when it is not a hint instruction it is determined at step 708 if it is an end hint instruction. If it is the flow proceeds via step 710 where the corresponding hint is deasserted to allow the default behaviour of the targeted component to resume. The flow then returns to step 700. If however at step 708 it is found not to be an end instruction the flow proceeds to step 712 where control signals are generated to implement the (regular, non-hint) instruction. In this example, where a counter is being used, at step 714 the counter is decremented (if active) and at step 716 it is determined if the counter has expired. If it has the flow proceeds to step 710 to deassert the appropriate hint (since the specified number of instructions following this hint has now been executed with the hint active). Otherwise the flow returns to step 700.

In brief overall summary an apparatus and method of operating a data processing apparatus are provided. The data processing circuitry is responsive to a hint instruction to then assert at least one performance modifying control signal, when subsequently generating control signals for other data processing instructions. This causes the data processing functional hardware which performs the data processing operations defined by the data processing instructions to operate in a modified manner, although the data processing results produced do not change in dependence on whether the at least one performance modifying control signal is asserted.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
   decoding circuitry to generate control signals in dependence on a sequence of data processing instructions; and
   data processing circuitry comprising data processing functional hardware,
   wherein the data processing circuitry is responsive to the control signals to operate the data processing functional hardware in an operating procedure to perform data processing operations defined by the sequence of data processing instructions to produce data processing results,
   wherein the decoding circuitry is responsive to a hint instruction preceding the sequence of data processing instructions to assert at least one performance modifying control signal when generating the control signals for the sequence of data processing instructions,
   and the data processing circuitry is responsive to assertion of the at least one performance modifying control signal to be responsive to the control signals to operate the data processing functional hardware in a modified operating procedure to perform the data processing operations defined by the sequence of data processing instructions to produce said data processing results, wherein the modified operating procedure differs from the operating procedure.

2. The apparatus as claimed in claim 1, wherein the hint instruction defines a number of subsequent instructions for which the at least one performance modifying control signal is to be asserted.

3. The apparatus as claimed in claim 2, wherein the hint instruction defines the number of subsequent instructions for which the at least one performance modifying control signal is to be asserted with reference to a hint assertion vector, wherein each bit in the hint assertion vector corresponds to an instruction in the number of subsequent instructions.

4. The apparatus as claimed in claim 2, further comprising count circuitry to maintain a count of instructions for which the at least one performance modifying control signal has been asserted.

5. The apparatus as claimed in claim 1, wherein the hint instruction defines a type of instructions for which the at least one performance modifying control signal is to be asserted.

6. The apparatus as claimed in claim 1, wherein the hint instruction provides a hint type vector, wherein the hint type vector identifies which of plural performance modifying control signals are to be asserted.

7. The apparatus as claimed in claim 1, wherein the hint instruction specifies a program counter value and the decoding circuitry is responsive to the hint instruction to assert at least one performance modifying control signal until the program counter value is reached.

8. The apparatus as claimed in claim 1, wherein the decoding circuitry is responsive to a hint ending instruction to cease assertion of the at least one performance modifying control signal.

9. The apparatus as claimed in claim 1, wherein the decoding circuitry is responsive to the sequence of data processing instructions to generate a sequence of decoded data processing instructions, and the decoding circuitry is responsive to the hint instruction to modify decoding of the sequence of data processing instructions to generate a modified sequence of decoded data processing instructions.

10. The apparatus as claimed in claim 9, further comprising at least one cache storage to store decoded data processing instructions.

11. The apparatus as claimed in claim 10, wherein the at least one cache storage is at least one of a micro-op cache, an L0 cache, and a loop cache.

12. The apparatus as claimed in claim 9, further comprising content addressable memory storage to store entries comprising indications of plural program counter values and at least one associated performance modifying control signal to be asserted when an instruction matching one of the indications of the plural program counter values in encountered.

13. The apparatus as claimed in claim 12, wherein entries of the content addressable memory storage further comprise an indication of a thread identifier, wherein the decoding circuitry further requires the indication of the thread identifier to match a current thread to assert the at least one associated performance modifying control signal.

14. The apparatus as claimed in claim 12, wherein entries of the content addressable memory storage further comprise an indication of a process identifier, wherein the decoding circuitry further requires the indication of the process identifier to match a current process to assert the at least one associated performance modifying control signal.

15. The apparatus as claimed in claim 12, wherein the content addressable memory storage is provided on a parallel path to an instruction cache.

16. The apparatus as claimed in claim 1, wherein the data processing circuitry is responsive to assertion of the at least one performance modifying control signal to modify a manner in which at least one of:

caching;
prefetching;
branch prediction;
decode width selection;
instruction caching;
atomic memory transacting;
memory transaction order constraining; and
dynamic binary translation.

17. The apparatus as claimed in claim 1, wherein the data processing circuitry is responsive to assertion of the at least one performance modifying control signal to omit at least one data processing operation defined by a data processing instruction in the sequence of data processing instructions, to produce said data processing results unmodified by omission of the data processing instruction.

18. A method of operating a data processing apparatus comprising:

generating control signals in dependence on a sequence of data processing instructions;
operating data processing functional hardware in response to the control signals in an operating procedure to perform data processing operations defined by the sequence of data processing instructions to produce data processing results;
asserting at least one performance modifying control signal when generating the control signals for the sequence of data processing instructions in response to a hint instruction preceding the sequence of data processing instructions; and
operating the data processing functional hardware in response to assertion of the at least one performance modifying control signal and the control signals in a modified operating procedure to perform the data processing operations defined by the sequence of data processing instructions to produce the data processing results, wherein the modified operating procedure differs from the operating procedure.

19. Apparatus comprising:

means for generating control signals in dependence on a sequence of data processing instructions;
means for operating data processing functional hardware in response to the control signals in an operating procedure to perform data processing operations defined by the sequence of data processing instructions to produce data processing results;
means for asserting at least one performance modifying control signal when the control signals are generated for the sequence of data processing instructions in response to a hint instruction preceding the sequence of data processing instructions; and
means for operating the data processing functional hardware in response to assertion of the at least one performance modifying control signal and the control signals in a modified operating procedure to perform the data processing operations defined by the sequence of data processing instructions to produce the data processing results, wherein the modified operating procedure differs from the operating procedure.

* * * * *